(No Model.) 2 Sheets—Sheet 1.
E. GERBER.
POT OR KETTLE.
No. 519,764. Patented May 15, 1894.
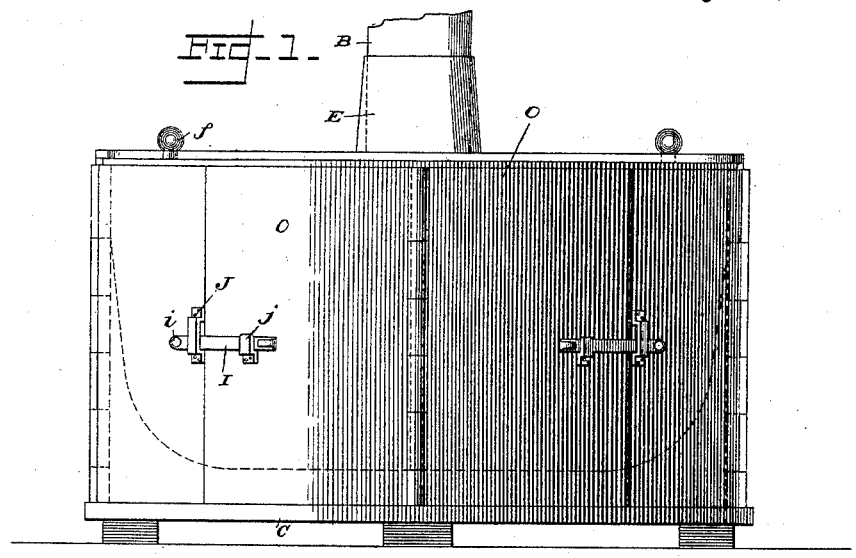
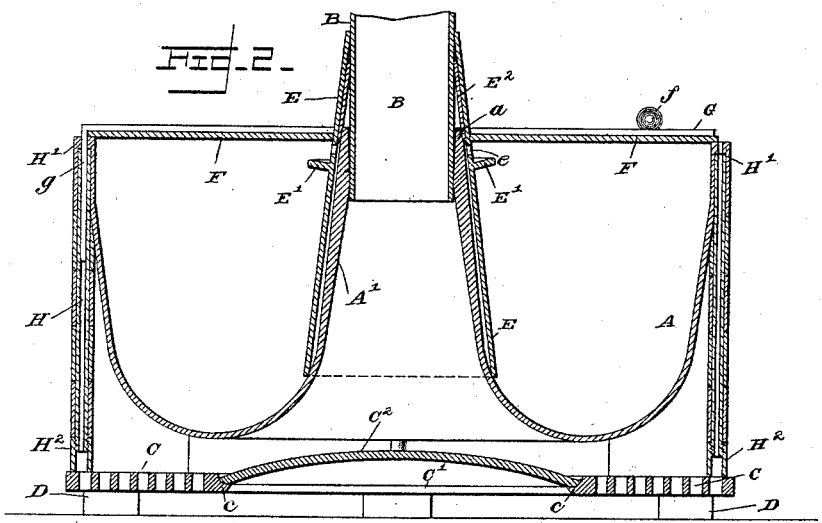
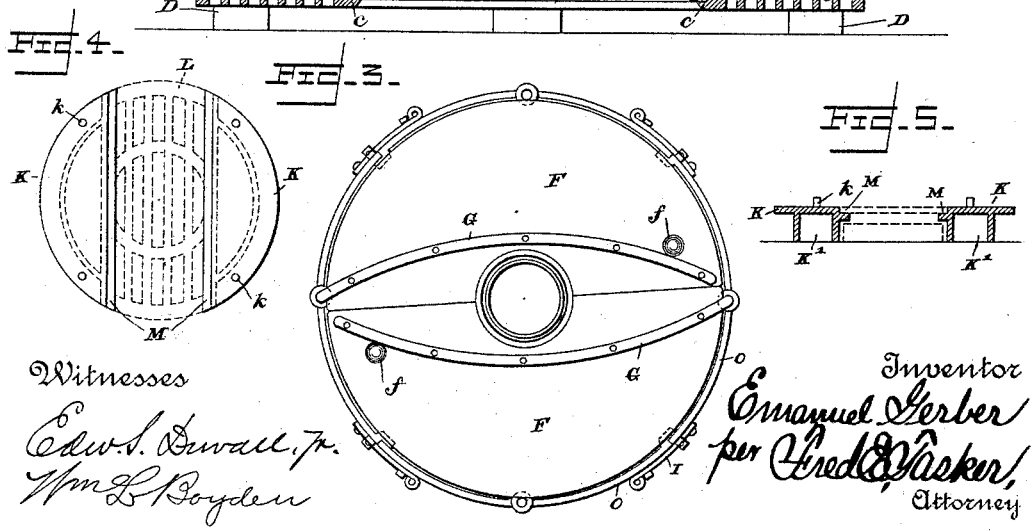
Witnesses
Edw. S. Duvall, Jr.
Wm. L. Boyden
Inventor
Emanuel Gerber
per Fred E. Tacker,
Attorney (No Model.) 2 Sheets—Sheet 2.

E. GERBER.
POT OR KETTLE.

No. 519,764. Patented May 15, 1894.

Witnesses
Edw. S. Duvall Jr.
Wm. L. Boyden

Inventor
Emanuel Gerber
per Fred E. Tasker
Attorney

THE NATIONAL LITHOGRAPHING COMPANY,
WASHINGTON, D. C.

UNITED STATES PATENT OFFICE.

EMANUEL GERBER, OF CHATTANOOGA, TENNESSEE.

POT OR KETTLE.

SPECIFICATION forming part of Letters Patent No. 519,764, dated May 15, 1894.

Application filed July 6, 1893. Serial No. 479,739. (No model.)

*To all whom it may concern:*

Be it known that I, EMANUEL GERBER, a citizen of the United States, residing at Chattanooga, in the county of Hamilton and State of Tennessee, have invented certain new and useful Improvements in Pots or Kettles; and I do hereby declare the following to be a full, clear, and exact description of the invention, such as will enable others skilled in the art to which it appertains to make and use the same.

This invention relates to an improvement in pots or kettles for use by farmers or other persons for the purpose of cooking food for animals, boiling clothes, or for any other desired purpose, the object being to provide a pot, kettle, caldron, or similar receptacle, wherein food of various kinds can be cooked with as little cost as possible, thereby achieving economy and at the same time providing a cooker equally as efficient as other various kinds now in use, which necessitate the use of a much larger amount of fuel to produce the same result, and the invention therefore consists in the construction, arrangement, and combination of parts and in numerous details thereof, substantially as will be hereinafter described and then more particularly pointed out in the claims.

Figure 6:
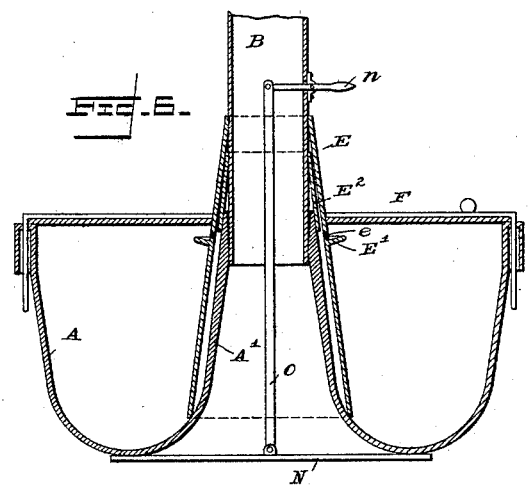
Figure 7:
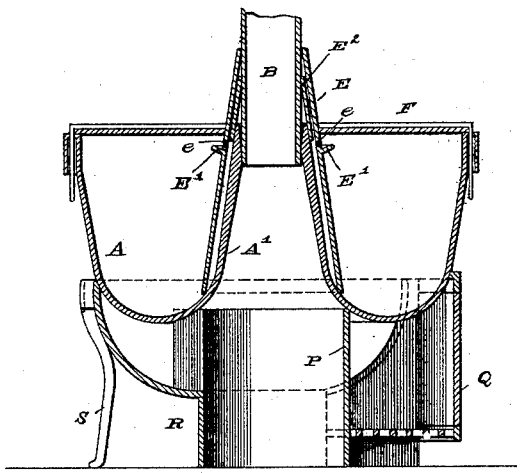
Figure 8:
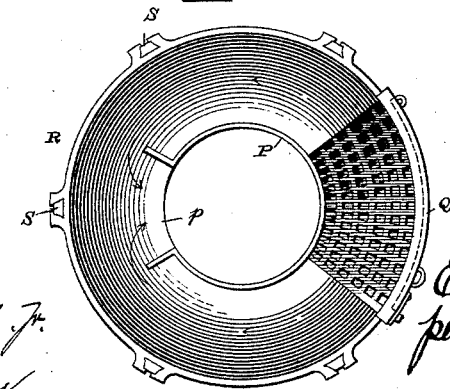

In the accompanying drawings illustrating my invention: Figure 1 is a side elevation of my improved pot or kettle. Fig. 2 is a vertical section of the same. Fig. 3 is a top plan view on a diminished scale. Fig. 4 is a partial plan view of a modification of the grate shown on a smaller scale. Fig. 5 is a cross section of the form shown in Fig. 4. Fig. 6 is another vertical section showing the damper arrangement. Fig. 7 is a vertical section of the kettle located upon a modified construction of fire box or stove, whereby flues, passages and a grate are provided to permit the more thorough heating of the under surface of the kettle. Fig. 8 is a top plan view showing the construction and arrangement of the parts of the fire box or stove illustrated in Fig. 7.

Similar letters refer to corresponding parts.

A designates the body of the pot or kettle being preferably of a circular form, of annular shape, with a rounded bottom and a central tubular portion A', which has a flaring or mouth shaped upper end $a$. Into this flaring end $a$ is inserted the pipe or flue B, it being secured therein by being slipped in tightly, and the object of the flue being to carry off the smoke and other products of combustion which arise through the tubular portion A', from the grate beneath the bottom of the pot whereon the fire is located, around and underneath the convex annular kettle bottom already referred to, and all of which is clearly shown in Fig. 2. The flue B will also serve to create a draft so as to permit combustion beneath the kettle.

The grate which forms a part of the combination and which is located horizontally beneath the kettle body A, may be of any suitable and desirable construction and in actual practice it will be found convenient to make it in many different forms for use with kettles or caldrons having different functions and of different sizes, &c.

One form of grate is shown in Fig. 2 and another form in Figs. 4 and 5. The form in Fig. 2, comprises a circular grate C, made with grate bars in the usual manner and having the large central opening C', the edges of which are provided with lugs or projections $c$ $c$, on which rests a convex plate $C^2$, which covers and closes the opening C', and which in combination with the grate C constitutes the bottom part of the fire box of the kettle. The purpose of convexing the solid plate $C^2$ or making it like the section of a globe, is so that expansion may easily take place therewith, without causing it to break. The grate proper C is provided with legs D D on which the grate, and in fact the entire kettle rests. These legs may be longer or shorter and may be cast integral with the grate or made separate from it and may be of any number, size and shape, it being only necessary that they should be able to accommodate their function, which is to properly support the kettle.

In consequence of the arrangement of the central tubular portion A', centrally above the grate whereon the fire is built, it will be obvious that although the heat from the fire will be applied strongly and effectually to the convex annular bottom of the body A, yet a great amount of heat must necessarily pass up into the tubular part A', and there will therefore be a very great concentration of heat within this tube A' and near the upper end thereof. This extraordinary concentration of heat at this point in the kettle body, might do a great deal of harm to the contents of the kettle, especially if such contents were clothes and especially if the water should be low in the kettle. I have constructed my kettle therefore with the idea, both of utilizing the intense heat which is created at this point and also of preventing any damage ensuing therefrom to the contents of the kettle. Therefore I provide an extra tube, E somewhat larger than the tube A' and preferably of an inverted conical shape as shown in Figs. 1 and 2, and this outside tube E incloses the tube A', with an intervening space between them. The lower edge of the outside tube E rests somewhat loosely and without a tight joint, upon the inside of the kettle body A, near the bottom thereof, while the upper end of tube E, fits snugly around the flue B, at a short distance above the flaring mouth $a$, furnishing a brace for flue B. Tube E is provided near the upper edge of the kettle with a few lateral openings $e$ which permit a communication between the interior of the annular space between the tube E and the tube A', and the interior of body A, as is clearly shown in Fig. 2. Water will enter to a greater or less extent from the pot through the rough joint at the bottom of tube E, into the annular space and will therein be greatly heated and converted into vapor. Foam or steam will therefore pass at certain times from the interior of the annular space between the two tubes, out through perforations $e$ into the interior of the kettle A, thereby moderating the heat and preventing damage. It will thus be found that this combination and arrangement of parts will keep the space between the tubes continually moist by foam or steam, and serve to prevent any damage being done to the contents of the pot by the intense heat created at the center of the same, and at the same time this great heat will be effectually utilized for the purpose of making the pot more efficient in its action.

The inverted conical tube E may be provided with more than one series of perforations $e$ if desired. It is also furnished on its outer surface with a horizontally inclined encircling flange E', preferably located closely adjacent to and below the series of perforations $e$, as shown in Figs. 2, 6 and 7. The flange E' provides a shelf or receptacle on which soap may be placed when the pot is being used for the purpose of washing clothes. The soap when in this position will dissolve and run down through the perforations $e$ into the space between the tubes E and A' and being therein thoroughly heated in conjunction with the water therein, a foam will be created which will rise within the said space and spew out through the perforations $e$ into the interior of the kettle A, thereby as it were, making a regular fountain of hot soapy water over the clothes that may be within the kettle, this spraying action at times being so strong as to throw the water almost out to the outer edge of the kettle. This action of the soap and water will make the kettle much more efficient in its operation. Irrespective of the use of soap in connection with the flange E', said flange will be found to be of great advantage in assisting in the process of washing, because the water instead of running down through the tube will run out from the edges of this flange upon the clothes.

It will be particularly observed that the tube E has a much larger diameter at its base than at its top. This is an important feature thereof because it thereby corresponds in form to the central tube A' and said tube by being of a form greater in diameter near its bottom than at its top gives a greater or larger heating surface under the kettle. This peculiar form of the tube A' therefore is a characteristic feature on which I strongly rely to establish the merits of my improved kettle over those now in the market. Said tube A', having the inverted conical shape, enables the kettle to accomplish highly useful results, even if the surrounding tube E is dispensed with. If the tube A' were of the same diameter throughout, being simply a vertical tube of uniform size from end to end, it would not expose the same amount of surface to the action of the fire beneath and consequently the best results in cooking or washing, would not be obtained as the heat would not be of the same power within the pot.

In addition to having the inclosing tube E, I sometimes employ a second tube $E^2$, located either partly or wholly within the tube E, and surrounding the pipe B and also the flaring mouth-end $a$ of the central tubular portion A'. This tube $E^2$ is likewise a tapering tube. It serves to prevent the water, or other contents of the pot, from getting through the joint where the pipe B fits into the flaring mouth $a$ of the central tube A' as will be clearly shown by referring to Figs. 2, 6 and 7. This tube $E^2$ may be used or dispensed with as preferred.

On the top of the kettle is a cover for closing the same which is preferably made in two parts, F F, meeting together at the center of the kettle, as shown in Fig. 3, the edges of said covers F F being cut out centrally with semicircular notches in order to inclose the tube E. These covers F F swing horizontally outward from the center. They are hinged by means of the straps G G, which are riveted, bolted or otherwise firmly secured to the upper faces of the covers and are provided with right angled spindles $g$ at their ends which enter sockets provided for them, as is clearly shown in Fig. 2 and whereby the spindles are permitted to freely rotate and thus the covers can be readily opened or closed. These covers are preferably furnished with suitable knobs $f f$ which are adapted to be grasped for the purpose of opening or closing them.

My improved kettle or caldron is provided with a series of hollow vertical legs. These legs are made of ordinary pieces or sections of metallic tubing or piping H and they are inserted at their upper ends firmly in lugs H' cast on the edge of the kettle. The lower ends of these pipes H carry preferably the couplings H², as shown in Fig. 2 and they are calculated to rest upon the grate C. The lugs H' are perforated to permit the passage through them of the vertical spindles $g$, which as shown in Fig. 2, are located within said lugs H' and also within a part of the tubular legs H. I consider that the use of ordinary piping or tubing for the purpose of providing legs for the kettle, enables me to make said legs in the simplest form possible and yet does not detract from their efficiency or value for the purpose of supporting the kettle firmly above the fire box.

Around the kettle body A is arranged a series of doors O O, which completely surround the body A and form the outside wall of the pot, inclosing thereby the fire box so that the fire can be built within a closed compartment. The doors O O are hinged upon the tubular feet H as this is the most convenient manner of arranging them. I preferably hinge two doors upon the same leg H, as shown in Fig. 1, but said doors may be arranged differently if preferred. These doors latch together at their adjacent or meeting edges, as is clearly shown in Fig. 1.

I denotes a latch bar which is pivoted at $i$ to one door and works within a strap J secured to said door, while its opposite end is adapted to engage a staple $j$ secured to the other door, the inner face of which staple is preferably somewhat inclined so that as the latch I engages it, it will exert a wedging action and thereby draw the two door edges closely against the side of the kettle and against each other, thereby making a tight joint. Other means for securing the edges of the doors together may be employed if desired. Although I have here explained that it is my preference to hang two doors upon each of the kettle legs, yet I do not wish to be restricted to such an arrangement, because other methods may be employed in actual practice at various times.

It is to be particularly observed that other kinds of grates, than the one herein described may be employed and that the kettle can often be used without any fire pot beneath and around the same. The combination of the body A, with its central tube A', flue B and outer tube E, will often be found efficient without the use of the surrounding wall composed of doors and the sub-lying grate beneath the body A. I reserve the liberty therefore of using either all or part of the combination in the various ways in which the same may be put into actual practice.

In Figs. 4 and 5, I have represented a modification in the construction of the grate. In this modification it consists of two sections K K, substantially semicircular in form and having flanges underneath at K' K' which form feet for these semicircular sections K K. Said sections are solid and are located at the outer sides of the fire pot. Their inner parallel edges are flanged or rabbeted at M M to permit a grate as L, to be placed horizontally thereon when desired, in order to form a grate having the same function as the one shown in Fig. 2. On the upper surface of the parts K K are pins $k\ k$, over which the tubular legs of the kettle are intended and supposed to fit for the purpose of securely locating the kettle above the grate. This will be found to be a very satisfactory and convenient form and I shall often desire to employ the same in the construction of my improved kettle.

It is often necessary to control the draft passing through the central tube A'. In order to do this I provide a horizontal damper plate N, as shown in Fig. 6, located below the annular convex bottom A and in contact therewith, said plate N being adapted to be lowered or raised so as to open or close the lower end of the central tube A'. To this plate N is pivoted the lower end of a vertical rod O, which extends up through tube A' and also for a short distance through the pipe B. A hand lever $n$ is pivoted in the wall of the pipe D and connected to the upper end of the rod O. By manipulating the hand lever $n$, rod O can be raised or lowered and consequently the damper N opened or closed so that the draft may thereby be effectually regulated. A regulating device of this character is especially needful with pots and kettles used for the purpose of rendering lard and evaporating juice in the manufacture of sugar, sirups and for similar purposes.

In Figs. 7 and 8, I have shown an improved fire box or fire base, arranged so as to promote the best heating effect to be produced upon the under surface of the pot or kettle. This fire box, or stove, as it may be termed, consists of an outer circular or curved wall R, provided with legs S and an inner concentric vertical circular wall P, having an opening $p$ in the rear of said wall. In front is a grate Q on which the fire is built. The heat arising from the fire Q passes around the central wall P, through the annular space between wall P and outer wall R, until it finds the opening $p$ through which it enters into the interior of the space surrounded by wall P, then passes upward into the tube A', the lower end of which tube is in contact with the upper edge of the wall P, inasmuch as the pot or kettle A is supported on the improved fire box in the manner shown in Fig. 7, resting as is there clearly indicated upon the walls P and R. When this improved fire box is employed, the several doors, legs, &c., which are shown in Figs. 1 and 2, will be removed from the kettle. Thus it will be seen that a very effectual construction for enabling a thorough heating of the under surface of the kettle is hereby provided. A horizontal annular flue is furnished whereby the heat from the grate is conveyed around underneath the annular convex bottom of the kettle before it has an opportunity to enter into the central tubular portion A'. In this way the under surface of the kettle is thoroughly heated throughout. The fire is made, as is seen, at a point on one side of the fire pot and is taken therefrom in such a way as I have already shown, as to heat uniformly and effectually all parts of the kettle.

Having thus described my invention, what I claim as new, and desire to secure by Letters Patent, is—

1. The herein-described kettle or pot for use in boiling clothes, cooking food, &c., consisting in the combination with the main body, of a central tubular part, a pipe or flue entering the upper end of said part and an inclosing outer tube surrounding the flue and the central tubular portion, said inclosing tube having an encircling outer flange and one or more rows of perforations, substantially as described.

2. In a pot or kettle, the combination of the annular convex body with a central tubular section, a pipe entering the upper end of said section, an inclosing tube surrounding said pipe and the upper end of the central tube, and a second longer inclosing tube surrounding the first mentioned inclosing tube, substantially as described.

3. The combination of the annular convex body A, with the central inclined tube A', the pipe B entering the upper end of tube A' and the inverted conical inclosing tube E having flange E', substantially as described.

4. The combination with the annular convex body, having a central, tubular section of the fire box located beneath the same and provided with a horizontal annular flue which conveys the heat underneath the entire surface of the annular body, and a central vertical flue which admits the heat from the horizontal flue into the central tubular part of the kettle, substantially as described.

5. The combination with the main body of the kettle, of the fire box, having a grate Q located at one point, the central circular wall P having opening $p$ and the concentric outer wall R, all arranged, substantially as described.

6. The combination with the annular convex body, with its central, tubular portion, of a damper operating in connection with the lower end of said portion, substantially as described.

7. The combination with the annular body and its central flue, of the horizontal damper at the bottom of said flue and a suitable leverage mechanism for operating the latter, substantially as described.

In testimony whereof I affix my signature in presence of two witnesses.

EMANUEL GERBER.

Witnesses:
   THEO. GERBER,
   T. HITZ.